(12) United States Patent
Kondo et al.

(10) Patent No.: US 6,453,960 B1
(45) Date of Patent: Sep. 24, 2002

(54) PREPREG AND FIBER-REINFORCED RUBBER MATERIALS

(75) Inventors: Haruhiko Kondo, Ehime (JP); Takao Manabe, Ehime (JP); Hajime Kishi, Ehime (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/673,730

(22) PCT Filed: Dec. 27, 1999

(86) PCT No.: PCT/JP99/07333

§ 371 (c)(1),
(2), (4) Date: Oct. 20, 2000

(87) PCT Pub. No.: WO00/50495

PCT Pub. Date: Aug. 31, 2000

(30) Foreign Application Priority Data

Feb. 22, 1999 (JP) .............................................. 11-042868
Sep. 29, 1999 (JP) .............................................. 11-276327

(51) Int. Cl.[7] .......................... D02G 3/48; B60C 9/00; B32B 27/38; B32B 27/04
(52) U.S. Cl. .................... 152/451; 428/413; 428/297.4; 428/299.1; 428/521; 428/522
(58) Field of Search ............................. 428/413, 297.4, 428/299.1, 521, 522; 152/451, 527, 556

(56) References Cited

U.S. PATENT DOCUMENTS

| | | | |
|---|---|---|---|
| 4,883,712 A | 11/1989 | Ogawa et al. | |
| 4,891,267 A | 1/1990 | Takahashi et al. | |
| 5,151,142 A | * | 9/1992 | Imai et al. ................ 152/565 |
| 5,246,735 A | * | 9/1993 | Takata et al. .............. 427/175 |

FOREIGN PATENT DOCUMENTS

| | | |
|---|---|---|
| JP | 60-085001 | 5/1985 |
| JP | 62-149977 | 7/1987 |
| JP | 62-149978 | 7/1987 |
| JP | 7-228716 | 8/1995 |

* cited by examiner

Primary Examiner—Robert Dawson
Assistant Examiner—Michael J Feely
(74) Attorney, Agent, or Firm—Morrison & Foerster LLP (57) ABSTRACT

The object is to provide a carbon fiber-reinforced rubber material which is superior in heat resistance, water resistance, and dimensional stability and exhibits resistance to fatigue from flexing at a practical level. The present invention relates to a prepreg comprising a liquid rubber composition having a viscosity in a range of 0.01 Pa·s to 100 Pa·s at 70° C. and substantially containing no solvent, the liquid rubber being impregnated into a reinforcing fiber, and relates to a fiber-reinforced rubber material comprising the prepreg in which the liquid rubber is crosslinked. Also, the present invention relates to a fiber-reinforced rubber material comprising a substrate comprising a rubber component, the substrate being reinforced by a core material comprising a prepreg of a reinforcing fiber impregnated with the same rubber component.

31 Claims, 1 Drawing Sheet

PREPREG AND FIBER-REINFORCED RUBBER MATERIALS

This is a National Stage Application of PCT/JP99/07333 filed on Dec. 27, 1999, now WO 00/50495 published on Aug. 31, 2000, which claims priority to Japanese Applications 042868/99, filed on Mar. 22, 1999 and 276327/99, filed on Sep. 29, 1999.

TECHNICAL FIELD

The present invention relates to a prepreg comprising a liquid rubber composition impregnated into a reinforcing fiber by heat, pressure and the like, and relates to a fiber-reinforced rubber material comprising the prepreg, the liquid rubber contained in the prepreg being crosslinked by heat or the like.

The present invention also relates to a fiber-reinforced rubber material of which substrate containing rubber component is reinforced by core material composed of prepreg of which reinforcing fiber is impregnated with rubber component. Moreover, the present invention relates to tires, hoses, and transmission belts used in automobiles and office automation equipment which use these fiber-reinforced rubber materials.

BACKGROUND ART

Fiber-reinforced rubber materials reinforced by reinforcing fibers have been widely used in industrial products, such as tires, belts, and hoses. These rubber products undergo repeated deformation and particularly require resistance to fatigue from flexing.

Carbon fibers have superior heat resistance and superior water resistance, in addition, to high modulus and high strength. Thus, using thereof as reinforcing fibers, fiber-reinforced rubber materials having significantly high dimensional stability and weather resistance are obtained. Carbon fibers, however, have disadvantages, e.g., poor resistance to fatigue from friction between filaments and poor adhesion to rubber. When a fiber-reinforced rubber material using a carbon fiber undergoes flexing fatigue, filaments break or separation occurs at interfaces between fibers and rubber.

As an attempt to prevent fatigue due to friction between filaments, Japanese Unexamined Patent Application Publication No. 60-85001 discloses a carbon fiber impregnated with a liquid resin or a liquid rubber. In such a method, however, friction between filaments is insufficiently prevented and resistance to fatigue from flexing of the fiber-reinforced rubber material must be further improved.

As attempts to improve adhesion to rubber, Japanese Unexamined Patent Application Publication Nos. 62-149977 and 62-149978 disclose improvements in adhesion of a core material including a carbon fiber bundle: impregnated with liquid butadiene rubber or liquid acrylonitrile-butadiene rubber to solid isoprene as a substrate. In such a method, however, adhesion is not sufficiently improved and resistance to fatigue from flexing of the fiber-reinforced rubber material must be further improved.

No practical carbon fiber-reinforced rubber material which exhibits sufficient heat resistance, water resistance, and dimensional stability due to properties of the carbon fibers and which exhibits resistance to fatigue from flexing has been found.

DISCLOSURE OF INVENTION

In order to solve the above-mentioned problems, the present invention includes the following constitution. That is, a prepreg comprising a liquid rubber composition having a viscosity in a range of 0.01 Pa·s to 100 Pa·s at 70° C. and containing substantially no solvent, the liquid rubber being impregnated into a reinforcing fiber, and a fiber-reinforced rubber material comprising the prepreg in which the liquid rubber is crosslinked.

In order to solve the above-mentioned problems, the present invention includes the following constitution. That is, a fiber-reinforced rubber material of which substrate comprising a rubber component is reinforced by a core material composed of a prepreg of which reinforcing fiber is impregnated with the same rubber component.

REFERENCE NUMERALS

1: core material
2: substrate
3: filaments of reinforcing fiber
11: core material
12: substrate
13: filaments of reinforcing fiber
14: RFL-based adhesive

BEST MODE FOR CARRYING OUT THE INVENTION

The liquid rubber used in the present invention is a composition which is primarily composed of a rubber, which is liquid in an uncrosslinked state at ordinary temperatures and pressures (25° C. and 1 atmosphere) and which has a glass transition temperature of 25° C. or below in a crosslinked state. On the other hand, solid rubber is a composition which is primarily composed of a rubber, which is solid in an uncrosslinked state at ordinary temperatures and pressures (25° C. and 1 atmosphere), and which has a glass transition temperature of 25° C. or below in a crosslinked state. The terms "liquid rubber" and "solid rubber" are general concepts in the field of rubber. As an approximate guideline for reference, that having a viscosity of less than 2000 Pa·s at 25° C. and 1 atmosphere is assigned to the liquid rubber, whereas that having a viscosity of 2000 Pa·s or more at 25° C. and 1 atmosphere is assigned to the solid rubber. The liquid rubber and the solid rubber may contain thermoplastic resins, thermoplastic elastomers, inorganic particles, antioxidants, and the like, if necessary.

In the present invention, the viscosity of the liquid rubber composition at 70° C. is 0.01 to 100 Pa·s, preferably 0.1 to 50 Pa·s, and more preferably 0.5 to 25 Pa·s. A viscosity of less than 0.01 Pa·s results in the formation of portions not containing the liquid rubber due to sagging during impregnation and cannot prevent friction between filaments. As a result, the fiber-reinforced rubber material may exhibit insufficient resistance to fatigue from flexing in some cases. A viscosity exceeding 100 Pa·s also results in the formation of portions unimpregated by the liquid rubber during impregnation and cannot prevent friction between filaments. As a result, the fiber-reinforced rubber material may exhibit insufficient resistance to fatigue from flexing in some cases.

An example of the liquid rubber composition in the present invention is that containing a liquid polymer and a crosslinking agent.

Examples of liquid polymers used in the liquid rubber of the present invention include liquid acrylonitrile-butadiene copolymers, liquid ethylene-propylene copolymers, liquid silicones, liquid polyisoprene, liquid polyesters, liquid polyethers, liquid polychloroprene, liquid polysulfides, liquid polybutadiene, liquid poly(oxypropylene), liquid poly(oxytetramethylene) glycol, liquid polyolefin glycol, and liquid poly-ε-caprolactone.

Among these, the liquid acrylonitrile-butadiene copolymers, the liquid polyisoprene, and the liquid polybutadiene exhibit good impregnation to carbon fiber bundles and are preferably used.

The liquid polymers used in the liquid rubber composition of the present invention may be telechelic polymers having reactive functional groups, such as amino groups, isocyanate groups, epoxy groups, carboxyl groups, and hydroxyl groups, at ends of molecular chains thereof. The use of the telechelic polymers is preferable since adhesive between the crosslinked liquid rubber and the filaments of the reinforcing fiber is improved.

Examples of the telechelic polymers include hydroxyl-terminated polybutadiene, carboxyl-terminated polybutadiene, epoxy-terminated polybutadiene, hydroxyl-terminated acrylonitrile-butadiene copolymers, carboxyl-terminated acrylonitrile-butadiene copolymers, epoxy-terminated acrylonitrile-butadiene copolymers, hydroxyl-terminated polyesters, isocyanate-terminated polyesters, hydroxyl-terminated polyether, and isocyanate-terminated polyether.

The number average molecular weight of the liquid polymer used in the liquid rubber of the present invention is preferably 500 to 5,000, more preferably 1,000 to 4,000, and most preferably 2,000 to 3,000. At a number average molecular weight of less than 500, the fiber-reinforced rubber material does not exhibit flexibility at low temperatures and may not have low-temperature resistance. At a number average molecular weight of more than 5,000, the deterioration of the fiber-reinforced rubber material proceeds at high temperatures and the fiber-reinforced rubber material may not have thermal resistance. When the number average molecular weight is in a range of 500 to 5,000, the fiber-reinforced rubber material exhibits superior low-temperature resistance and thermal resistance and is usable in a wide temperature range.

Examples of crosslinking agents used in the liquid rubber composition of the present invention include sulfur, peroxides, amines, isocyanates, epoxys, and carboxylic acids. The crosslinking agents are compounded in amounts of preferably 2 to 30 parts by weight, more preferably 5 to 25 parts by weight, and most preferably 10 to 20 parts by weight, on a basis of 100 parts by weight of the liquid polymer. A content of less than 2 parts by weight causes an insufficient crosslinking reaction and a decrease in thermal resistance of the fiber-reinforced rubber material. At a content of more than 30 parts by weight, the crosslinking agent is partly unreacted and thus the fiber-reinforced rubber material may exhibit decreased water resistance and solvent resistance.

Examples of crosslinking agents used together with telechelic polymers having hydroxyl groups include diisocyanates, e.g. tolylene diisocyanate, diphenylmethane diisocyanate, and isophorone diisocyanate.

In order to achieve compatibility between the viscosity stability at a temperature of impregnation of the liquid rubber composition into the reinforcing fiber and the crosslinking reactivity of the liquid rubber, that is,the matrix portion, at a temperature for forming the fiber-reinforced rubber material, it is preferable to use blocked isocyanates in which the isocyanate groups are blocked with phenols, oximes, lactams and the like. The blocked isocyanates are compounds in which blocking parts are dissociated to generate isocyanate groups when being heated to predetermined temperatures.

Examples of crosslinking agents used together with telechelic polymers having carboxyl groups include aliphatic epoxy compounds, e.g., neopentyl glycol diglycidyl ethers and trimethylolpropane triglycidyl ether, and aromatic epoxy compounds, e.g., diglycidyl ether bisphenol A and tetraglycidyl diaminodiphenylmethane.

Examples of crosslinking agents used together with telechelic polymers having isocyanate groups or epoxy groups include aliphatic amine compounds, e.g., diethylenetriamine, tetraethylenepentamine, and isophoronediamine; and aromatic amine compounds, e.g., m-phenylenediamine, diaminodiphenylmethane, and diaminodiphenyl sulfone.

The liquid rubber composition in accordance with the present invention may be one containing an epoxy resin having a flexible skeleton and a hardener. Herein, the epoxy resin having a flexible skeleton indicates an epoxy compound not having an aromatic ring, e.g., a benzene ring or a naphthalene ring, in the chemical structure.

Example of the epoxy resin having a flexible skeleton used in the present invention include allyl glycidyl ether, ethylhexyl glycidyl ether, dimer acid diglycidyl esters, polyglycidyl ether of castor oil, butyl glycidyl ether, polyethylene glycol diglycidyl ether, polyglycerol polyglycidyl ether, polypropylene glycol diglycidyl ether, and the like.

Among these, polyethylene glycol diglycidyl ether, polypropylene glycol diglycidyl ether, and polypropylene glycol diglycidyl ether exhibit good impregnation to carbon fiber bundles and are preferably used.

In general, when a compound of a hardener and an epoxy resin such as a bisphenol A type epoxy resin is heated, a crosslinked material, which is hard near room temperature, is obtained. In contrast, when a compound of a hardener and an epoxy resin having a flexible skeleton is heated, a crosslinked material, which is soft near room temperature, is obtained.

The epoxy equivalent of the epoxy resin used in the liquid rubber composition of the present invention is preferably 250 to 2,500, more preferably 300 to 2,000, and most preferably 400 to 1,000. At an epoxy equivalent of less than 250, the fiber-reinforced rubber material may not exhibit flexibility at low temperatures and may not have low-temperature resistance. At an epoxy equivalent of more than 2,500, the deterioration of the fiber-reinforced rubber material proceeds at high temperatures and the fiber-reinforced rubber material may not have thermal resistance. When the epoxy equivalent is in a range of 500 to 5,000, the fiber-reinforced rubber material exhibits superior low-temperature resistance and thermal resistance and is usable over a wide temperature range.

Examples of hardeners compounded in the epoxy resin of the present invention include aliphatic amines, aromatic amines, dicyandiamide, polyamides, acid anhydrides, phenol, imidazoles, acid hydrazides, and the like. Among these, aliphatic amines and polyamides facilitate the formation of soft fiber-reinforced rubber materials and are preferably compounded.

In the present invention, solvents, such as water, ethanol, toluene, acetone, and methyl ethyl ketone, must not be contained substantially in the liquid rubber composition. When these solvents are contained in the liquid rubber, the solvents are evaporated during thermal crosslinking of the liquid rubber in the prepreg, and thus voids are readily generated in the fiber-reinforced rubber material. In the voids, friction occurs between the filaments of the reinforcing fiber and the fiber-reinforced rubber material exhibits decreased resistance to fatigue from flexing. Only by using a prepreg impregnated with a liquid rubber not containing a solvent, tires and belts having durability at practical levels are obtainable.

The phrase "the liquid rubber composition does not substantially contain a solvent" means to an extent not causing the above problems. For example, even if components classified as solvents in general concept are contained, it is considered that the liquid rubber does not substantially contain solvents, as long as gaseous components are not substantially generated in the liquid rubber under heating conditions in general processing due to a very little amount of the solvent in the liquid rubber, sufficiently high boiling points or decomposition points of the solvents, or hydrogen bonding of the solvents to the liquid rubber.

The phrase "the liquid rubber composition does not substantially contain a solvent" means, but is not limited to, that the solvent content in the overall liquid rubber is 1 percent by weight or less, or that the temperature causing the generation of gaseous components, such as a boiling point or a decomposition point of the solvent, is 140° C. or above, preferably 160° C. or above, and more preferably 180° C. or above.

Solvents are often used in production processes of raw material components of liquid rubber compositions. In the present invention, the residual content of the solvents in the liquid rubber is preferably 0.8 percent by weight or less, more preferably 0.5 percent by weight or less, and most preferably 0.2 percent by weight or less to the overall liquid rubber. At a content of 0.8 percent by weight or less, the fiber-reinforced rubber material exhibits superior resistance to fatigue from flexing and practical durability.

In the present invention, the liquid rubber composition may contain thermoplastic resins, thermoplastic elastomers, inorganic particles, and the like, if necessary. These are effective for modification of the liquid rubber, such as for controlling the rheology of the uncrosslinked liquid rubber, for improving the wear resistance and the crack propagation resistance of the crosslinked liquid rubber.

Examples of thermoplastic resins include polyamides, polyamide-imides, polyarylene oxides, polyarylates, polyimides, polyethylene, polyethylene terephthalate, polyether imides, polyether ether ketone, polyether sulfone, polycarbonates, polyvinyl acetate, polystyrene, polysulfones, polyvinyl acetal, polyvinyl alcohol, polyvinyl butyral, polyvinyl formal, polyphenylene oxide, polyphenylene sulfide, polypropylene, polybenzimidazole, and polymethyl methacrylate. These thermoplastic resins may be compounded alone or in combination.

Examples of thermoplastic elastomers include styrenic thermoplastic elastomers having hard segments of polystyrene and soft segments of butadiene or isoprene; olefinic thermoplastic elastomers having hard segments of polypropylene or polyethylene and soft segments of ethylene-propylene copolymers; butadienic thermoplastic elastomers having hard segments of syndiotactic 1,2-polybutadiene and soft segments of atactic 1,2-polybutadiene; urethanic thermoplastic elastomers having hard segments of polyurethanes prepared by a reaction of short-chain glycols with isocyanates and having soft segments prepared by a reaction of long-chain glycols and isocyanates; thermoplastic ester elastomers having hard segments of aromatic polyesters and soft segments of aliphatic polyesters or polyethers; and thermoplastic amide elastomers having hard segments of polyamides and soft segments of polyesters or polyethers. These thermoplastic elastomers may be compounded alone or in combination.

In the present invention, these thermoplastic resins and the thermoplastic elastomers may be compounded in combination.

The thermoplastic resins and/or the thermoplastic elastomers are compounded in amounts of preferably 1 to 20 percent by weight and more preferably 2 to 15 percent by weight on a basis of 100 percent by weight of the liquid rubber composition. At a content of less than 1 percent by weight, the above modification effect may not be sufficiently exhibited. At a content of more than 20 percent by weight, the viscosity of the liquid rubber increases and portions unimpregnated by the liquid rubber may be formed in the prepreg. In such a case, the fiber-reinforced rubber material may exhibit insufficient resistance to fatigue from flexing due to friction between the filaments of the reinforcing fiber.

Examples of inorganic particles include alumina, carbon black, kaolin, aluminum silicate, calcium silicate, magnesium silicate, titanium oxide, antimony trioxide, silica, aluminum hydroxide, calcium hydroxide, magnesium hydroxide, talc, calcium carbonate, magnesium carbonate, bentonite, mica, and montmorillonite. These inorganic particles may be compounded alone or in combination. Among these, carbon black is effective and preferable for improving the wear resistance of the rubber materials.

The inorganic particles are compounded in amounts of preferably 1 to 20 percent by weight and more preferably 2 to 15 percent by weight on a basis of 100 percent by weight of the liquid rubber composition. At a content of less than 1 percent by weight, the modification effects may be insufficient. At a content of more than 20 percent by weight, the inorganic particles may damage the surfaces of filaments, when the liquid rubber is impregnated into the reinforcing fiber, resulting in decreased resistance to fatigue from flexing.

The reinforcing fiber used in the present invention may be at least one form selected from the group consisting of continuous fibers, fabrics, braids, tows, knits, and mats. Examples of the reinforcing fibers include aramid fibers, glass fibers, carbon fibers, nylon fibers, and polyester fibers. Among these, carbon fibers have high strength, high modulus, high exellent thermal resistance, and high water resistance, and they are preferably used. When these are applied to transmission belts, it is preferable that the fibers are oriented in the transmission direction of the belt to stabilize the dimensions of the transmission belt.

The tensile strength of the carbon fiber is preferably 4,000 MPa or more, more preferably 4,400 MPa, and most preferably 4,500 MPa. At a tensile strength of less than 4,000 MPa, the carbon fibers may break when a large load is applied to the fiber-reinforced rubber material. A tensile strength of the carbon fiber of 5,000 MPa is sufficient to exhibit the advantages of the present invention in most cases. The breaking elongation of the carbon fiber is preferably 1.6% or more and more preferably 1.8% or more. At a breaking elongation of less than 1.6%, the carbon fiber may break when flexural deformation having a large displacement is applied to the fiber-reinforced rubber material. A breaking elongation of the carbon fiber of 2.2% is sufficient to exhibit the advantages of the present invention in most cases.

In the carbon fiber, the number of filaments in a strand is preferably 1,000 to 20,000, more preferably 2,000 to 15,000, and most preferably 3,000 to 12,000. At a number of less than 1,000, the reinforcement effect may be insufficient. At a number of more than 20,000, portions unimpregnated by the liquid rubber may be formed in the reinforcing fiber and the resistance to fatigue from flexing may be insufficient.

The content of the reinforcing fiber in the prepreg of the present invention is preferably 20 to 80 percent by weight and more preferably 30 to 70 percent by weight. With respect to the lower limit, 50 percent by weight is more preferable and 60 percent by weight is most preferable. At a content of less than 20 percent by weight, the dimensional stability of the fiber-reinforced rubber material may be insufficient due to insufficient reinforcing effects. At a content of more than 80 percent by weight, the fiber-reinforced rubber material may exhibit insufficient resistance to fatigue from flexing due to friction between the filaments.

The prepreg of the present invention may be produced by a method in which a liquid rubber composition is uniformly applied onto a releasing sheet to form films, in which both surfaces of a reinforcing fiber are sandwiched by the films, and in which the films are impregnated into the reinforcing fiber by heat and pressure, or by a method in which a liquid rubber composition is poured into groove sections of a grooved roller and in which a reinforcing fiber is brought into contact with the groove sections to impregnate the liquid rubber, as disclosed in Japanese Unexamined Patent Application Publication No. 9-255799.

The impregnation temperature of the liquid rubber composition is preferably 140° C. or below, more preferably 130° C. or below, and most preferably 120° C. or below. In consideration of compatibility between the viscosity stability and impregnating ability, the temperature is preferably 40 to 100° C., more preferably 50 to 90° C., and most preferably 60 to 80° C. from a practical point of view. At a temperature of below 40° C., the viscosity of the liquid rubber is significantly high and unimpregnated portions may be formed. At a temperature above 140° C., the viscosity of the liquid rubber is significantly low and defects may be formed.

The fiber-reinforced rubber material of the present invention is prepared by crosslinking the rubber component in the prepreg by heat and pressure. Methods for crosslinking the rubber other than heating and pressurizing using a press are electron irradiation, gamma-ray irradiation, UV irradiation, and the like.

The fiber-reinforced rubber material in accordance with the present invention is such that the substrate comprising a rubber component is reinforced by a core material composed of a prepreg of which reinforcing fiber is impregnated with a rubber component. In said fiber-reinforced rubber material, the core material contributes to dimensional stability of the substrate and the substrate protects the core material from friction with the exterior. In the core material composed of the prepreg impregnated with the rubber component, fatigue due to friction between the filaments of the reinforcing fiber is prevented. Thus, the fiber-reinforced rubber material exhibits superior resistance to fatigue from flexing.

Both liquid rubber and solid rubber can be used as the rubber component in the core material, and a liquid rubber is preferable in view of good impregnation to the reinforcing fiber bundles. Both liquid rubber and solid rubber can be used as the rubber component in the substrate, and a solid rubber is preferable since it can be used as a sheet in production and is easily handled.

Examples of the rubber components contained in the core material and the substrate of the present invention include acrylic rubbers, acrylonitrile-butadiene rubbers, isoprene rubbers, urethane rubbers, ethylene-propylene rubbers, epichlorohydrin rubbers, chloroprene rubbers, silicone rubbers, styrene-butadiene rubbers, polysulfide rubbers, butadiene rubbers, butyl rubbers, fluoro rubbers, natural rubber, and chlorosulfonated polyethylene rubbers.

Among these rubber components, the acrylonitrile-butadiene rubbers are suitable for uses which require oil resistance. Favorable acrylonitrile-butadiene rubbers are hydrogenated acrylonitrile-butadiene rubbers in which unsaturated bonds, which are readily degraded by heat, are partly saturated by hydrogenation. On the other hand, urethane rubbers are suitable for uses which require wear resistance, and chloroprene rubbers are suitable for uses which require weather resistance.

In the present invention, the core material and the substrate preferably contain the same kind of rubber component. When the core material and the substrate contain the same kind of rubber component, the adhesion between the core material and the. substrate is enhanced and the interface is barely separated by repeated flexural deformation. Thus, the resulting fiber-reinforced rubber material exhibits superior resistance to fatigue from flexing.

In the present invention, "the same kind" in the rubber components indicates that the rubber components to be compared belong to the same kind. Herein, "kind" indicates each "kind" when the rubber components are classified into the acrylic rubber, the acrylonitrile-butadiene rubber, the isoprene rubber, the urethane rubber, the ethylene-propylene rubber, the epichlorohydrin rubber, the chloroprene rubber, the silicone rubber, the styrene-butadiene rubber, the polysulfide rubber, the butadiene rubber, the butyl rubber, and fluoro rubber (in this classification, the isoprene rubber contains the natural rubber), based on the chemical structures of the rubber components.

In other words, the rubber components to be compared are regarded as being of the same kind when the repeating units of the polymer, which are precursors of the rubber components to be compared, are of the same kind in the chemical formula. Thus, the rubber components are regarded as being of "the same kind" as long as these are classified as being of the same kind in the chemical formula, regardless of the steric configurations, the geometric conformations, e.g., cis-, trans-, or the like, the sequence, e.g., random, block, or the like, the number (degree of polymerization), and the ratio (polymerization ratio) of the repeating units. Accordingly, such a classification is determined by only one principle regardless of whether the rubber components to be compared are liquid rubbers or solid rubbers.

In the present invention, the same kind of rubber component contained in the core material is contained in the substrate in an amount of desirably 50 percent by weight or more, preferably 65 percent by weight or more, more preferably 7 5 percent by weight or more, and most preferably 90 percent by weight or more, on a basis of 100 percent by weight of the total rubber component contained in the substrate. At a content of 50 percent by weight or more, the interface between the core material and the substrate is barely separated. Thus, the resulting fiber-reinforced rubber material exhibits superior resistance to fatigue from flexing.

In the present invention, the same kind of rubber component contained in the substrate is contained in the core in an amount of desirably 50 percent by weight or more, preferably 65 percent by weight or more, more preferably 75 percent by weight or more, and most preferably 90 percent by weight or more, on a basis of 100 percent by weight of the total rubber component contained in the core material. At a content of 50 percent by weight or more, the interface between the core material and the substrate is barely separated. Thus, the resulting fiber-reinforced rubber material exhibits superior resistance to fatigue from flexing.

It is preferable that the difference in monomer residue rate between the core material and the substrate is small. In particular, when the acrylonitrile-butadiene rubber is contained as the same kind of rubber component, it is preferable that the difference in the nitrile group residue rates between the rate by 100 percent by weight of all rubber components (containing the same kind of rubber and different kinds of rubbers) contained in the core material and the rate by 100 percent by weight of all rubber components contained in the substrate is small so that adhesion is enhanced at the interface. Such a difference in content is preferably 10 percent by weight or less, more preferably 5 percent by weight or less, and most preferably 2 percent by weight or less. Moreover, it is preferred that the difference in component ratio of the same kind of rubbers satisfy the upper limit of the above difference in the content.

When the core material and the substrate contain acrylonitrile-butadiene rubbers as the same kind of rubber components, it is preferable that these rubbers belong to the same type for the reason of enhanced adhesion at the interface. Herein, "type" indicates each "type" when the acrylonitrile-butadiene rubbers are classified according to bonded nitrile content(percent by weight)into a low-nitrile type having a bonded nitrile content of 24% or less, a medium-nitrile type having a bonded nitrite content of 25 to 30%, a medium/high-nitrile type having a bonded nitrite content of 31 to 35%, a high-nitrile type having a bonded nitrile content of 36 to 42%, and an ultrahigh-nitrile type having a bonded nitrile content of 43% or more.

When the fiber-reinforced rubber material is fabricated in the present invention, it is preferable that an RFL adhesive (a mixture of a resorcinol-formaldehyde resin and a rubber latex) is in advance applied on the surface of the prepreg. Using the RFL adhesive, the adhesion at the interface of the core material comprising the prepreg and the substrate containing the rubber component is enhanced and the resulting fiber-reinforced rubber material exhibits superior resistance to fatigue from flexing.

The RFL adhesive is prepared by, for example, adding resorcinol and formalin into an aqueous, alkaline solution of sodium hydroxide or the like, by being allowed to stand at 25° C. (room temperature) for several hours to yield an initial condensation product of resorcinol and formaldehyde, and then by adding a rubber latex.

Examples of rubber latex include acrylonitrile-butadiene rubber latex, chloroprene rubber latex, styrene-butadiene rubber latex, natural rubber latex, vinylpyridine-styrene-butadiene rubber latex, and butadiene rubber latex. Among these, the vinylpyridine-styrene-butadiene rubber latex is effective for enhancing the adhesion at the interface between the core material and the substrate and improving the resistance to fatigue from flexing.

Since the RFL adhesive is an aqueous adhesive, it is preferable that after applied onto the surface of the prepreg, the water is removed by heating before the fiber-reinforced rubber material is fabricated.

The amount of the RFL adhesive after the removal of the water is preferably 1 to 30 percent by weight, more preferably 2 to 20 percent by weight, and most preferably 3 to 10 percent by weight of the prepreg. At a content of less than 1 percent by weight, the adhesion may be insufficiently improved at the interface between the core material and the substrate. At a content of more than 30 percent by weight, the flexibility of the fiber-reinforced rubber material may be decreased.

Embodiments of the fiber-reinforced rubber material in accordance with the present invention will now be described with reference to the drawings.

Figure 1:
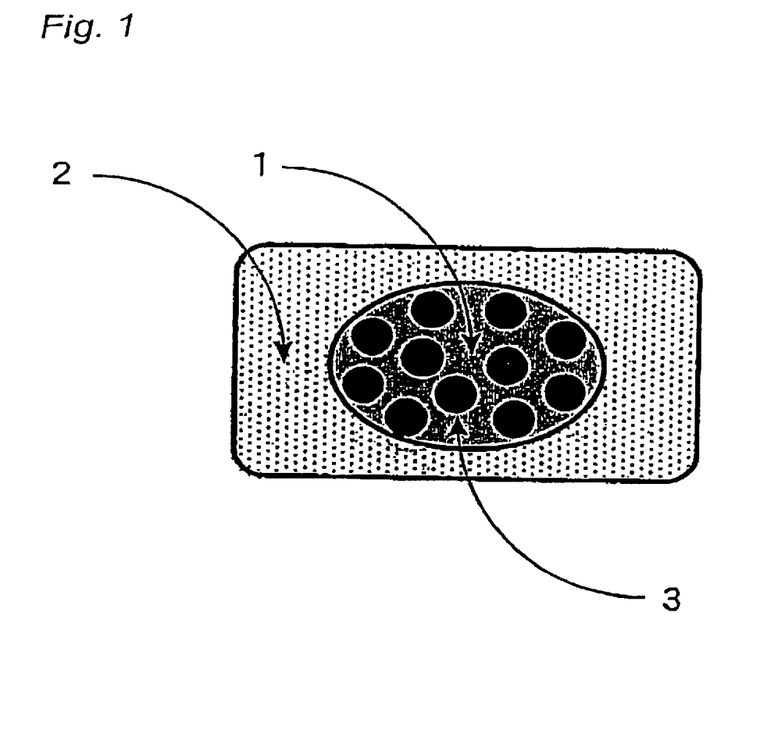
FIG. 1 is a cross-sectional view of an embodiment of a fiber-reinforced rubber material in accordance with the present invention.

FIG. 1 is a cross-sectional view in accordance with an embodiment of the fiber-reinforced rubber material of the present invention. In this embodiment, a substrate 2 containing rubber is reinforced by a core material 1 comprising a prepreg in which rubber is impregnated into a reinforcing fiber. Filaments 3 of the reinforcing fiber are covered by the impregnated rubber to prevent fatigue caused by friction.

Figure 2:
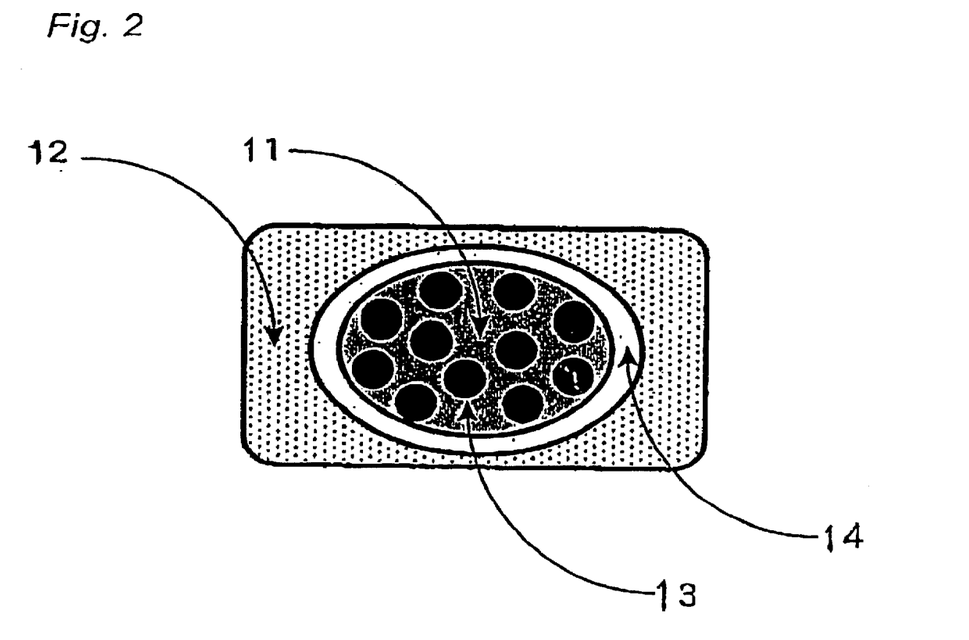
FIG. 2 is a cross-sectional view of another embodiment of a fiber-reinforced rubber material in accordance with the present invention.

FIG. 2 is a cross-sectional view in accordance with another embodiment of the fiber-reinforced rubber material of the present invention. In this embodiment, a substrate 12 containing rubber is reinforced by a core material 11 comprising a prepreg in which the surface is covered with an RFL adhesive 14 and rubber is impregnated into a reinforcing fiber. Filaments 13 of the reinforcing fiber are covered by the impregnated rubber to prevent fatigue caused by friction.

In the present invention, a transmission belt can be produced by the following process. For example, a prepreg prepared by the above method is wound on a metal drum, and is crosslinked by heat and pressure, and the cylindrical molding is removed from the metal drum and is cut into rings of a predetermined width. Alternatively, the above-mentioned solid rubber sheet is wound onto a metal drum, a prepreg is wounded thereon, another solid rubber sheet is wounded thereon, these are crosslinked by heat and pressure, and the cylindrical molding is removed from the metal drum and is cut into rings of a predetermined width. The latter method is preferred to the former method since the reinforcing fiber in the resulting transmission belt is protected from the exterior.

EXAMPLES 1 to 14

The following materials were used in these examples.
(1) Liquid Polymers
  (a) Hydroxyl-terminated polybutadiene: R-45HT (made by Idemitsu Petrochemical Co., Ltd.), number average molecular weight of 2,800
  (b) Carboxyl-terminated acrylonitrile-butadiene copolymer: CTBN 1300*31 (made by Ube industries, Ltd.), number average molecular weight of 3,500
(2) Crosslinking Agents
  (a) Blocked isocyanate (blocked diphenylmethane diisocyanate): CORONATE 2512 (made by Nippon Polyurethane Industry Co., Ltd.)
  (b) Tetraglycidyldiaminodiphenylmethane: SUMIEPOXY ELM434 (made by Sumitomo Chemical Co., Ltd.)
(3) Epoxy Resins
  (a) Polypropylene glycol diglycidyl ether: DENACOL EX-931 (made by Nagase Chemicals Ltd.), epoxy equivalent 530
  (b) Dimer acid and diglycidyl ester: EPIKOTE 871 (made by Yuka Shell Epoxy K. K.), epoxy equivalent 430
  (c) Polyglycidyl ether of castor oil: HELOXY 505 (made by Yuka Shell Epoxy K. K.), epoxy equivalent 600
(4) Hardeners
  (a) Dicyandiamide: DICY-7 (made by Yuka Shell Epoxy K. K.)

(b) Polyoxypropyleneamine: D-2000 (made: by Jefferson Chemicals Company, Inc.)

(5) Hardening Accelerator (a) 3-(3,4-Dichlorophenyl)-1,1-dimethylurea: DCMU-99 (made by Hodogaya Chemical Co., Ltd.)

(6) Thermoplastic Resin (a) Polyvinyl butyral: S-LEC BM-S (made by Sekisui Chemical Co., Ltd.)

(7) Thermoplastic Elastomer (a) Styrenic thermoplastic elastomer: KRATON FG1901X (made by Shell Chemical Co.)

(8) Carbon Fiber (a) TORAYCA T700S-12K-50C (made by Toray Industries, Inc.), tensile strength: 4,900 MPa, breaking elongation: 2.1%, number of filaments: 12,000

Fiber-reinforced rubber materials were prepared and evaluated according to the following steps (1) to (3).

(1) Preparation of Liquid Rubber

The raw materials according to the formulations shown in Tables 1 to 4 were mixed in a kneader to prepare liquid rubbers.

The viscosity of each of the resulting liquid rubbers was measured by the following method. That is, two aluminum disks, each having a diameter of 40 mm, were arranged in parallel at a gap of 1 mm, and the gap between the two disks was filled with the liquid rubber. After the atmospheric temperature was adjusted to a constant 70° C., the disks were reciprocally rotated at a frequency of 0.5 Hz. A torque applied to the disks was detected to calculate the viscosity of the liquid rubber at 70° C.

The viscometer used was "ARES" made by Rheometric Scientific Co.

(2) Preparation of Fiber-reinforced Rubber Material

Using a coater, the liquid rubber prepared by the step (1) was applied onto a releasing sheet to form films (weight per unit area: 52 g/m$^2$) so that the thickness is uniform.

Next, carbon fibers oriented in the same direction (weight per unit area: 190 g/m$^2$) were sandwiched by the films, and the liquid rubber was impregnated by heating at 80° C. under pressure to form prepregs.

After 32 sheets of prepregs were laminated so that the fibers were aligned in the same direction, the liquid rubber in the prepregs was crosslinked at a temperature of 140° C. and a pressure of 0.294 MPa for a period of 30 minutes to prepare a fiber-reinforced rubber material.

(3) Evaluation of Resistance to Fatigue from Flexing

The fiber-reinforced rubber material prepared by the step (2) was cut into test pieces, each having a thickness of 6.35 mm, a width of 6.25 mm, and a length of 76.2 mm so that the longitudinal direction of each test piece was the same as the direction of the fibers.

The test piece was flexed perpendicularly to the fiber direction 100,000 times by an amplitude of 3 mm, a frequency of 5 Hz at room temperature, and the tensile strength in the fiber direction was measured. The ratio of the tensile strength after flexural fatigue (Ta) to the tensile strength before the flexural fatigue (Tb) was defined as the tensile strength retention ratio. (=Ta/Tb) and was used as an index of the resistance to fatigue from flexing of the fiber-reinforced rubber material.

The results are summarized in Tables 5 and 6. The results show that the fiber-reinforced rubber materials of Examples 1 to 7 exhibit sufficiently improved resistance to fatigue from flexing compared to those of Examples 8 to 14 and are useful as materials for tires and belts.

EXAMPLES 15 to 25

The following materials were used in these examples.

(1) Liquid Polymers (a) Acrylonitrile-butadiene copolymer: NIPOL 1312 (made by Nippon Zeon Co., Ltd.), number average molecular weight of 2,000, bonded nitrile content of 34 percent by weight, no reactive functional group (b) Acrylonitrile-butadiene copolymer: NIPOL DN601 (made by Nippon Zeon Co., Ltd.), number average molecular weight of 2,000, bonded nitrile content of 28 percent by weight, carboxyl groups are contained (c) Polyisoprene: LIR-30 (made by Kuraray Co., Ltd.), number average molecular weight of 2,900, no reactive functional group (d) Polybutadiene: R-45HT (made by Idemitsu Petrochemical Co., Ltd.), number average molecular weight of 2,800, hydroxyl groups are contained (2) Crosslinking Agents (a) Sulfur: SANFEL EX (made by Sanshin Chemical Industry Co., Ltd.)

(b) Zinc oxide: activated zinc oxide AZO (made by Seido Chemical Industry Co., Ltd.)

(c) Stearic acid: stearic acid 300 (made by New Japan Chemical Co., Ltd.)

(d) Mercaptobenzothiazole: SANCELER M (made by Sanshin Chemical Industry Co., Ltd.)

(e) Tetraglycidyldiaminodiphenylmethane: SUMIEPOXY ELM434 (made by Sumitomo Chemical Co., Ltd.)

(f) Blocked isocyanate (blocked hexane: diisocyanate): DESMODUR TPLS2759 (made by Sumitomo Bayer Urethane Co., Ltd.)

(3) Thermoplastic Elastomer (a) Styrenic thermoplastic elastomer: KRATON G1650 (made by Shell Chemical Co.)

(4) Solid Rubbers (a) Acrylonitrile-butadiene rubber: NIPOL 1043 (made by Nippon Zeon Co., Ltd.), bonded nitrile content 29 percent by weight (b) Acrylonitrile-butadiene rubber: NIPOL DN002 (made by Nippon Zeon Co., Ltd.), bonded nitrile content 53 percent by weight (c) Isoprene rubber: NIPOL IR2200 (made by Nippon Zeon Co., Ltd.)

(d) Butadiene rubber: NIPOL BR1220 (made by Nippon Zeon Co., Ltd.)

(e) Sulfur: SANFEL EX (made by Sanshin Chemical Industry Co., Ltd.)

(f) Zinc oxide: activated zinc oxide AZO (made by Seido Chemical Industry Co., Ltd.)

(g) Stearic acid: stearic acid 300 (made by New Japan Chemical Co., Ltd.)

(h) Mercaptobenzothiazole: SANCELER M (made by Sanshin Chemical Industry Co., Ltd.)

(4) Carbon Fiber (a) TORAYCA T700S-12K-50C (made by Toray Industries, Inc.), tensile strength: 4,900 MPa, breaking elongation: 2.1%, number of filaments: 12,000.

Fiber-reinforced rubber materials were prepared and evaluated according to the following steps (1) to (3).

(1) Preparation of Tow Prepreg

The raw materials according to the formulations shown in Table 7 were mixed in a kneader to prepare liquid rubbers.

Each liquid rubber, which was preheated in an atmosphere at 70° C., was poured into grooves of a grooved rotational roller. A carbon fiber bundle was fed at a rate of 10 m/min and was introduced into the grooves to impregnate the liquid rubber into the fiber bundle. A tow prepreg was thereby prepared. The liquid rubber content in the prepreg was 40 percent by weight.

(2) Preparation of Cord

The prepreg prepared in step (1) was twisted 10 times/10 cm. The prepreg was dipped into a bath containing an RFL adhesive having a composition shown in Table 8 so that the adhesive was applied to the surface, and was introduced into a hot drying furnace at 150° C. to remove water contained in the adhesive. A cord (core material) was thereby prepared. The amount of the RFL adhesive adhered to the tow prepreg was 5 percent by weight after removing the water.

(3) Preparation of Fiber-reinforced Rubber Material

The cord prepared in step (2) was cut into 15 cm cut cords, and a 10 mm end of each cut cord was sandwiched by solid rubber sheets (substrates) having a composition shown in Table 9, a length of 3 cm, a width of 3 cm, and a thickness of 3 mm. The laminated cord and rubber sheets were vulcanized in a press at a temperature of 150° C. and a pressure of 0.294 MPa for 30 minutes to form a test piece.

The rubber sheet portion of the test piece was fixed by a clamp and the end of the cord was drawn in the vertical direction at a rate of 5 mm/s using a drawing tester. The external force (kg/10 mm) which was required for the drawing was regarded as an index of the adhesion strength at the interface between the substrate and the core material. As the drawing tester, INSTRON 4208 (made by INSTRON JAPAN) was used.

The results are summarized in Table 10. When the substrate (rubber sheet) and the core material (cord) contain the same type of rubbers, the adhesion strength at the interface between the substrate and the core material is further improved. When the acrylonitrile-butadiene rubbers are used, the adhesion strength is improved with a decreased difference in the bonded nitrite content of the acrylonitrile-butadiene rubber.

TABLE 1

Composition of Liquid Rubber

|  | Example 1 | Example 2 | Example 3 | Example 4 |
|---|---|---|---|---|
| R-45HT | 100 | 100 | — | — |
| CTBN 1300*31 | — | — | 100 | 100 |
| CORONATE 2512 | 18 | 18 | — | — |
| SUMIEPOXY ELM434 | — | — | 6 | 6 |
| S-LEC BM-S | 5 | — | 2 | — |
| KRATON FG1901X | — | 20 | — | 10 |

(Numbers in the Table indicate parts by weight)

TABLE 2

Composition of Liquid Rubber

|  | Example 5 | Example 6 | Example 7 |
|---|---|---|---|
| DENACOL EX-931 | 50 | — | — |
| EPIKOTE 871 | 50 | 50 | 100 |
| HELOXY 505 | — | 50 | — |
| DICY-7 | 2 | 2 | 1 |
| D-2000 | — | — | 30 |
| DCMU-99 | 2 | 2 | 1 |

TABLE 2-continued

Composition of Liquid Rubber

|  | Example 5 | Example 6 | Example 7 |
|---|---|---|---|
| S-LEC BM-S | 8 | — | 5 |
| KRATON FG1901X | — | 3 | — |

(Numbers in the Table indicate parts by weight)

TABLE 3

Composition of Liquid Rubber

|  | Example 8 | Example 9 | Example 10 | Example 11 |
|---|---|---|---|---|
| R-45HT | 100 | 100 | — | — |
| CTBN 1300*31 | — | — | 100 | 100 |
| CORONATE 2512 | 18 | 18 | — | — |
| SUMIEPOXY ELM434 | — | — | 6 | 6 |
| S-LEC BM-S | 2 | — | 34 | — |
| KRATON FG1901X | — | 38 | — | 2 |
| Toluene | 20 | — | — | 25 |

(Numbers in the Table indicate parts by weight)

TABLE 4

Composition of Liquid Rubber

|  | Example 12 | Example 13 | Example 14 |
|---|---|---|---|
| DENACOL EX-931 | 50 | — | — |
| EPIKOTE 871 | 50 | 50 | 100 |
| HELOXY 505 | — | 50 | — |
| DICY-7 | 2 | 2 | 1 |
| D-2000 | — | — | 30 |
| DCMU-99 | 2 | 2 | 1 |
| S-LEC BM-S | 2 | — | 25 |
| KRATON FG1901X | — | 30 | — |
| Toluene | 15 | — | — |

(Numbers in the Table indicate parts by weight)

TABLE 5

Results of Durability Evaluation

|  | Viscosity of Liquid Rubber Composition at 70° C. (Pa · s) | Tensile Strength Retention Ratio (Ta/Tb) |
|---|---|---|
| Example 1 | 0.05 | 0.82 |
| Example 2 | 83 | 0.81 |
| Example 3 | 0.20 | 0.87 |
| Example 4 | 41 | 0.86 |
| Example 5 | 0.65 | 0.90 |
| Example 6 | 1.3 | 0.96 |
| Example 7 | 0.95 | 0.92 |

TABLE 6

Results of Durability Evaluation

|  | Viscosity of Liquid Rubber Composition at 70° C. (Pa · s) | Tensile Strength Retention Ratio (Ta/Tb) |
|---|---|---|
| Example 8 | 0.003 | 0.56 |
| Example 9 | 150 | 0.53 |

TABLE 6-continued

Results of Durability Evaluation

| | Viscosity of Liquid Rubber Composition at 70° C. (Pa · s) | Tensile Strength Retention Ratio (Ta/Tb) |
|---|---|---|
| Example 10 | 210 | 0.48 |
| Example 11 | 0.005 | 0.67 |
| Example 12 | 0.002 | 0.45 |
| Example 13 | 170 | 0.51 |
| Example 14 | 110 | 0.69 |

TABLE 7

Composition of Liquid Rubber

| | Composition 1 | Composition 2 | Composition 3 | Composition 4 |
|---|---|---|---|---|
| NIPOL 1312 | 100 | — | — | — |
| NIPOL DN601 | — | 100 | — | — |
| LIR-30 | — | — | 100 | — |
| R-45HT | — | — | — | 100 |
| SANFEL EX | 15 | — | 15 | — |
| Activated Zinc Oxide AZO | 5 | — | 5 | — |
| Stearic Acid 300 | 1 | — | 1 | — |
| SANCELER M | 1 | — | 1 | — |
| ELM434 | — | 12 | — | — |
| TPLS 2759 | — | — | — | 15 |
| KRATON G1650 | 3 | 5 | 5 | 10 |

(Numbers in the Table indicate parts by weight)

TABLE 8

RFL Composition

| | Parts by Weight |
|---|---|
| Soft Water | 390 |
| Aqueous Sodium Hydroxide Solution (Concentration: 10 percent by weight) | 6 |
| Resorcinol | 25 |
| Aqueous Formaldehyde Solution (Concentration: 37 percent by weight) | 25 |
| Acrylonitrile-Butadiene Rubber Latex* | 540 |
| Aqueous Ammonia Solution (Concentration: 28 percent by weight) | 14 |

TABLE 9

Composition of Solid Rubber

| | Composition 5 | Composition 6 | Composition 7 | Composition 8 |
|---|---|---|---|---|
| NIPOL 1043 | 100 | — | — | — |
| NIPOL DN002 | — | 100 | — | — |
| NIPOL 1R2200 | — | — | 100 | — |
| NIPOL BR1220 | — | — | — | 100 |
| SANFEL EX | 1.5 | 1.5 | 2.5 | 1.5 |
| Activated Zinc Oxide AZO | 5 | 5 | 5 | 3 |
| Stearic Acid 300 | 1 | 1 | 2 | 2 |
| SANCELER M | 1 | 1 | 1 | 1 |

(Numbers in the Table indicate parts by weight)

TABLE 10

Evaluation of Adhesion

| | Composition of Liquid Rubber | Composition of Solid Rubber | Adhesion (kg/10 mm) |
|---|---|---|---|
| Example 15 | Composition 1 | Composition 5 | 24.3 |
| Example 16 | Composition 1 | Composition 6 | 22.0 |
| Example 17 | Composition 2 | Composition 5 | 25.1 |
| Example 18 | Composition 2 | Composition 6 | 21.8 |
| Example 19 | Composition 3 | Composition 7 | 22.5 |
| Example 20 | Composition 4 | Composition 8 | 23.5 |
| Example 21 | Composition 1 | Composition 7 | 13.2 |
| Example 22 | Composition 2 | Composition 8 | 15.4 |
| Example 23 | Composition 2 | Composition 7 | 14.5 |
| Example 24 | Composition 3 | Composition 5 | 13.1 |
| Example 25 | Composition 4 | Composition 7 | 12.7 |

Industrial Applicability

In the present invention, the reinforcing fiber is impregnated with a liquid rubber composition having a viscosity within an appropriate range and substantially containing no solvent; hence, the prepreg does not contain unimpregnated portions and defects. Thus, in the fiber-reinforced rubber material obtained by crosslinking, the liquid rubber contained in the prepreg, friction between the filaments is prevented, and thus, resistance to fatigue from flexing is significantly improved.

In the fiber-reinforced rubber material of the present invention, the substrate containing the rubber component is reinforced by the core material containing the same type of rubber component; hence, adhesion is strong at the interface between the substrate and the core material. Thus, the interface between the core material and the substrate is barely separated by repeated flexural deformation of the fiber-reinforced rubber material. Thus, the resulting fiber-reinforced rubber material exhibits superior resistance to fatigue from flexing.

The fiber-reinforced rubber material of the present invention exhibits a degree of resistance to fatigue from flexing which is at a practical level for a rubber material, such as that for a tire, a belt, or a hose, and the dimensional stability, thermal resistance, and water resistance of the carbon fiber is sufficiently utilized.

What is claimed is:

1. A prepreg comprising a reinforcing fiber and a liquid rubber composition, wherein the liquid rubber composition has a viscosity in a range of 0.01 Pa·s to 100 Pa·s at 70° C. and contains substantially no solvent, and comprises an epoxy resin having an epoxy equivalent of 250 to 2,500.

2. A prepreg according to claim 1, wherein the epoxy resin has a flexible skeleton.

3. A prepreg according to claim 1, wherein the epoxy resin is at least one selected from the group consisting of polyethylene glycol diglycidyl ether, polypropylene diglycidyl ether, and a diglycidyl ester of dimer acid.

4. A prepreg of claim 1, wherein the liquid rubber composition contains 1 percent or less by weight of solvent based on the overall weight of the liquid rubber composition.

5. A prepreg according to claim 1, wherein the liquid rubber composition comprises a liquid polymer having a number average molecular weight of 500 to 5,000.

6. A prepreg according to claim 1 or 5, wherein the liquid rubber composition comprises telechelic polymer.

7. A prepreg according to claim 1 or 5, wherein the liquid rubber composition comprises at least one liquid polymer selected from the group consisting of liquid acrylonitrile-butadiene copolymer, liquid polyisoprene, and liquid polybutadiene.

8. A fiber-reinforced rubber material obtained by crosslinking the liquid rubber composition in a prepreg according to claim 1 or 5.

9. A tire comprising a fiber-reinforced rubber material according to claim 8.

10. A belt comprising a fiber-reinforced rubber material claim 8.

11. A prepreg comprising a reinforcing fiber and a liquid rubber composition, the liquid rubber composition having a viscosity in a range of 0.01 Pa·s to 100 Pa·s at 70° C. and containing substantially no solvent, wherein the reinforcing fiber is carbon fiber.

12. A prepreg according to claim 11, wherein the liquid rubber composition comprises a liquid polymer having a number average molecular weight of 500 to 5,000.

13. A prepreg according to claim 11, wherein the liquid rubber composition comprises a telechelic polymer.

14. A prepreg according to claim 11, wherein the liquid rubber composition comprises at least one liquid polymer selected from the group consisting of liquid acrylonitrile-butadiene copolymer, liquid polyisoprene, and liquid polybutadiene.

15. A prepreg according to claim 11, wherein the liquid rubber composition comprises an epoxy resin and the epoxy equivalent of the epoxy resin is in a range of 250 to 2,500.

16. A prepreg according to claim 15, wherein the epoxy resin has a flexible skeleton.

17. A prepreg according to claim 16, wherein the epoxy resin is at least one selected from the group consisting of polyethylene glycol diglycidyl ether, polypropylene diglycidyl ether, and a diglycidyl ester of dimer acid.

18. A prepreg according to claim 1 or 11, wherein the reinforcing fiber has a tensile strength of 4,000 MPa or more.

19. A prepreg according to either claim 1 or 11, wherein the reinforcing fiber has a breaking elongation of 1.6% or more.

20. A fiber-reinforced rubber material comprising a substrate and a core material; wherein said substrate comprises at least one rubber component; wherein said core material comprises a prepreg comprising a reinforcing fiber and at least one rubber component; wherein said substrate and said core material comprise a common rubber component of the same kind of rubber; wherein 50 to 100 wt % of rubber components in the substrate comprise said common rubber component; and wherein 50 to 100 wt % of rubber components in the core material comprise said common rubber component.

21. A fiber-reinforced rubber material according to claim 20, wherein the common rubber component comprises an acrylonitrile-butadiene rubber having a bonded nitrile content in the range is selected from the group consisting of 24% or less, 25 to 30%, 31 to 35%, 36 to 42% or more.

22. A fiber-reinforced rubber material according to claim 20, wherein the common rubber component of the same kind comprises acrylonitrile-butadiene rubber.

23. A fiber-reinforced rubber material according to claim 22, wherein the acrylonitrile-butadiene rubber in the substrate is the same type of acrylonitrile-butadiene rubber as that in the core.

24. A fiber-reinforced rubber material according to any one of claims 20 to 23, wherein the common rubber component of the substrate and the common rubber component of the core material comprise a monomer residue rate, wherein the monomer residue rate in the substrate differs from the monomer residue rate in the core by 10 weight percent or less.

25. A fiber-reinforced rubber material according to any one of claims 20 to 23, wherein the common rubber component of the substrate and the common rubber component of the core material comprise a copolymer having a component ratio, wherein the component ratio in the substrate differs from the component ratio in the core by 10 weight percent or less.

26. A fiber-reinforced rubber comprising the fiber-reinforced rubber material according to any one of claims 20 to 23, wherein the reinforcing fiber is carbon fiber.

27. A fiber-reinforced rubber according to claim 26, wherein the carbon fiber has a tensile strength of 4,000 MPa or more.

28. A fiber-reinforced rubber according to claim 26, wherein the carbon fiber has a breaking elongation of 1.6% or more.

29. A tire comprising a fiber-reinforced rubber material according to any one of claims 20 and 22.

30. A belt comprising a fiber-reinforcing rubber material according to any one of claims 20 to 22.

31. A fiber-reinforced rubber material comprising a substrate and a core material; wherein said substrate comprises at least one rubber component; wherein said core material comprises a prepreg comprising a reinforcing fiber and at least one rubber component; wherein said substrate and said core material comprise a common rubber component of the same kind of rubber having structural repeating units; wherein the common rubber component in the substrate comprises a structural repeating unit having the same chemical formula as the structural repeating unit in the common rubber component of the core material; wherein 50 to 100 wt % of rubber components in the substrate comprise said common rubber component; and wherein 50 to 100 wt % of rubber components in the core material comprise said common rubber component.

* * * * *